No. 896,318.
G. B. PETSCHE.
GAS ENGINE.
APPLICATION FILED DEC. 30, 1904.
PATENTED AUG. 18, 1908.
5 SHEETS—SHEET 1.
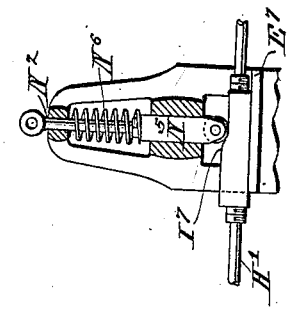
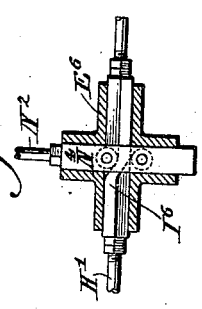
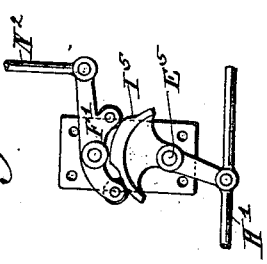
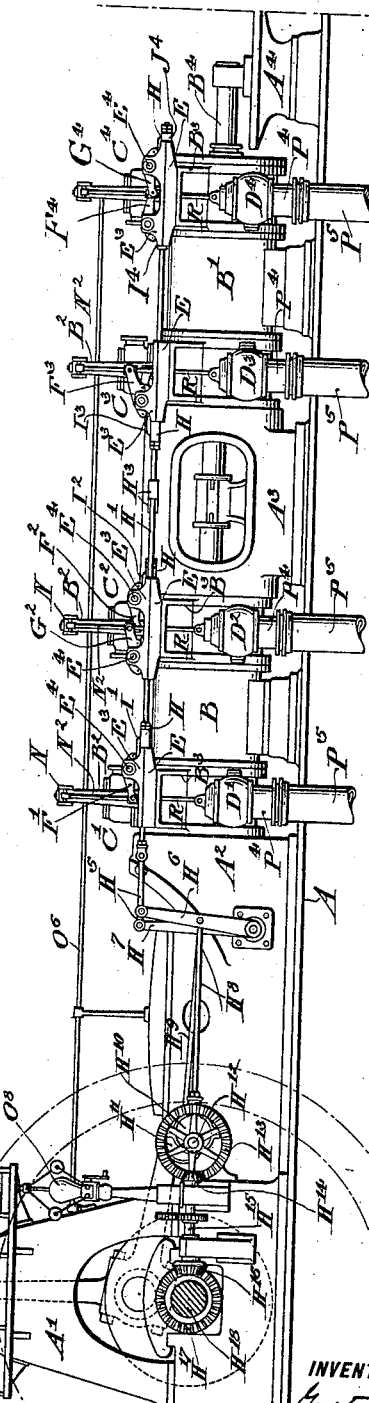
WITNESSES:
INVENTOR
Gustav B. Petsche
BY
his ATTORNEY.

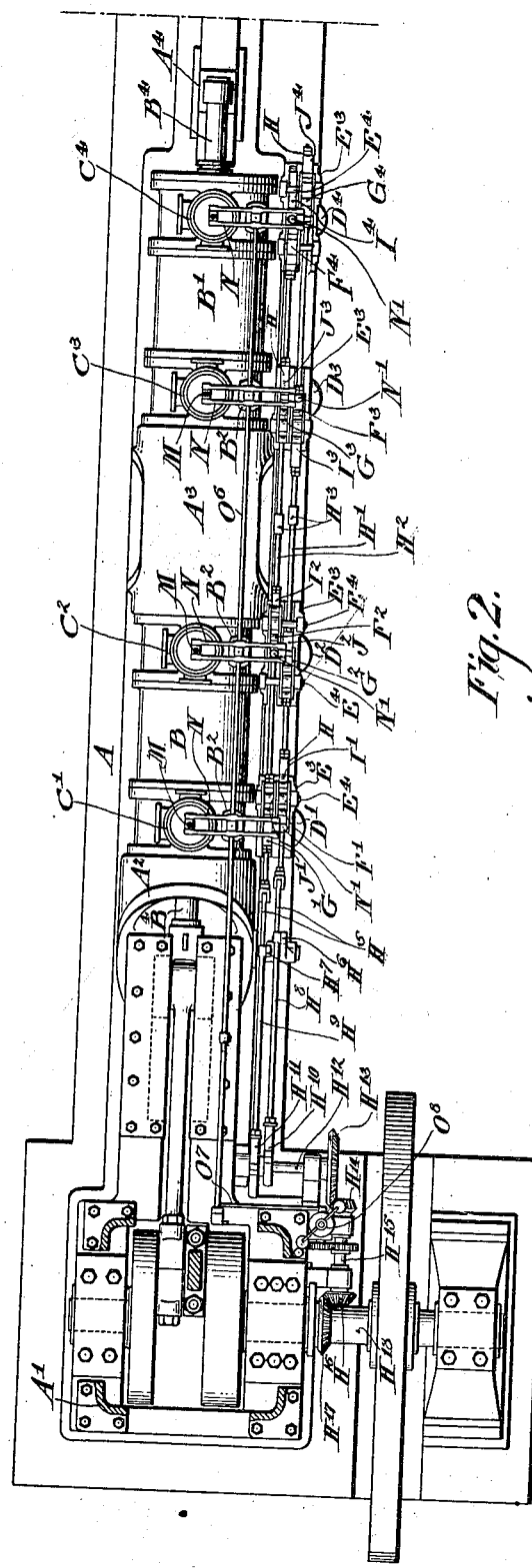

No. 896,318. PATENTED AUG. 18, 1908.
G. B. PETSCHE.
GAS ENGINE.
APPLICATION FILED DEC. 30, 1904.
5 SHEETS—SHEET 3.
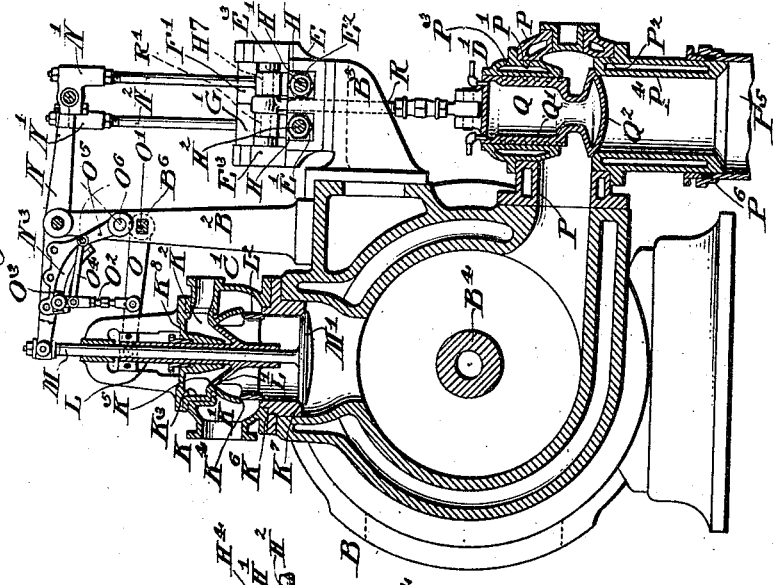
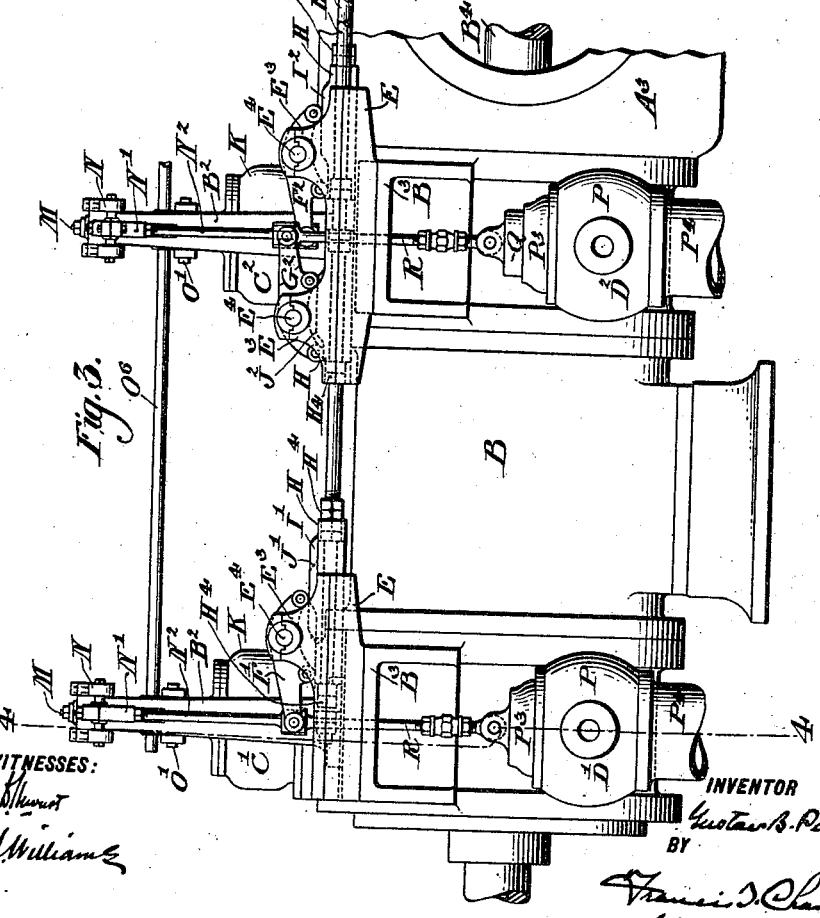
WITNESSES:
INVENTOR
Gustav B. Petsche
BY
Francis D. Chambers
his ATTORNEY.

No. 896,318. PATENTED AUG. 18, 1908.
G. B. PETSCHE.
GAS ENGINE.
APPLICATION FILED DEC. 30, 1904.

5 SHEETS—SHEET 4.

WITNESSES:

INVENTOR
Gustav B. Petsche
BY
Francis J. Chambers
ATTORNEY.

No. 896,318. PATENTED AUG. 18, 1908.
G. B. PETSCHE.
GAS ENGINE.
APPLICATION FILED DEC. 30, 1904.
5 SHEETS—SHEET 5.
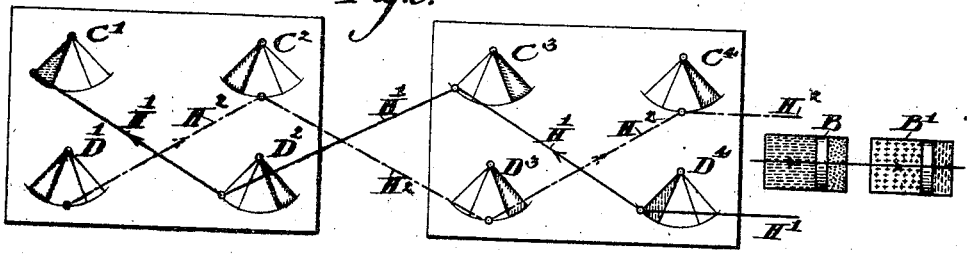
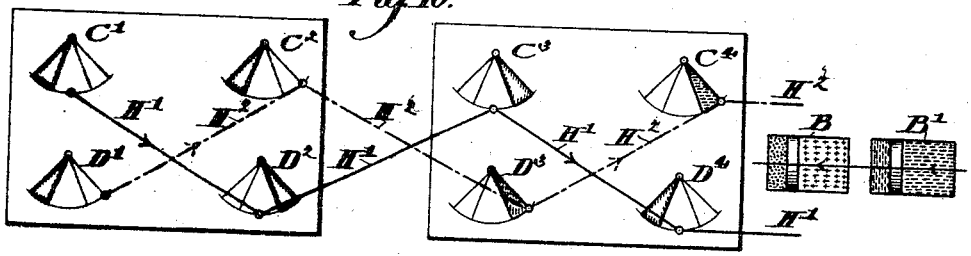
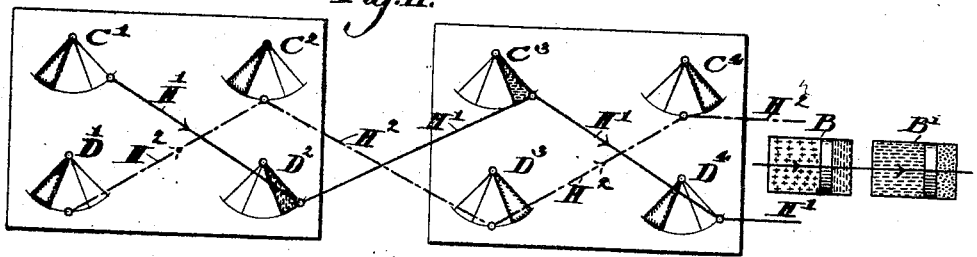
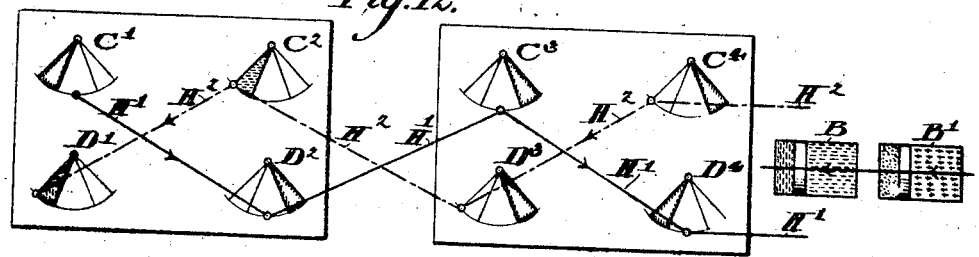
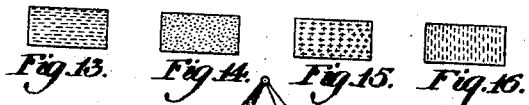
WITNESSES:
INVENTOR
Gustav B. Petsche
BY
Francis T. Chambers
his ATTORNEY.

UNITED STATES PATENT OFFICE.

GUSTAV B. PETSCHE, OF PHILADELPHIA, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

GAS-ENGINE.

No. 896,318.

Specification of Letters Patent.

Patented Aug. 18, 1908.

Application filed December 30, 1904. Serial No. 238,917.

*To all whom it may concern:*

Be it known that I, GUSTAV B. PETSCHE, a subject of the Emperor of Germany, residing in the city and county of Philadelphia, in the State of Pennsylvania, have invented a certain new and useful Improvement in Gas-Engines, of which the following is a true and exact description, reference being had to the accompanying drawings, which form a part thereof.

My invention relates to gas engines and has for its object to simplify and make more accessible the valves and valve actuating mechanism of such engines.

Important features of my invention are the placing of the admission and exhaust valve casings above and at the side of the cylinder, the valves situated in said casings having their stems extending upward and coupled to valve actuating mechanism situated above the bottom of the cylinder. By preference, the valve actuating mechanism is situated at the side of the cylinder, so as to lie above the valve casings which extend from the side of the cylinder and at the side of the valve casings which extend from the top of the cylinder.

Another and very important feature of my invention, consists in combining with the admission and exhaust valves of the engine cylinder or cylinders, two sets of reciprocating or oscillating cams, each set of cams being actuated by one of two eccentrics, or equivalent devices, set at 90° apart and rotating at one half the speed of the main engine shaft, the admission valves of the engine being operatively connected with cams of the different sets and so that the admission and exhaust valves at each end of the cylinder or cylinders are actuated by cams of the two different sets.

Figure 5:
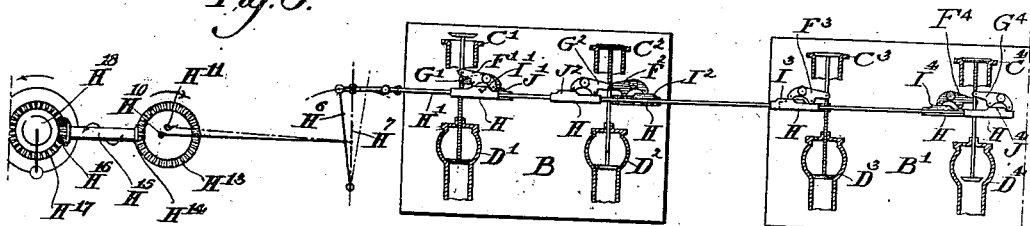
Figure 6:
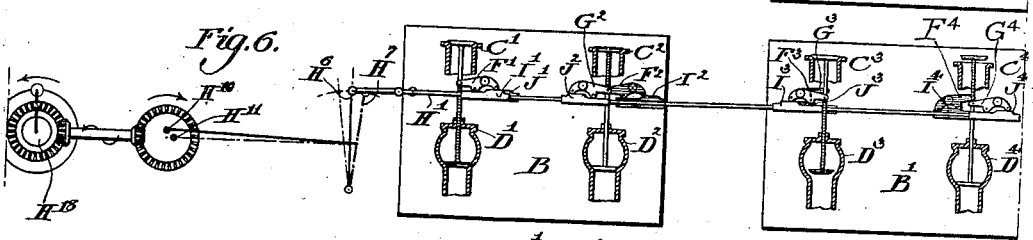
Figure 7:
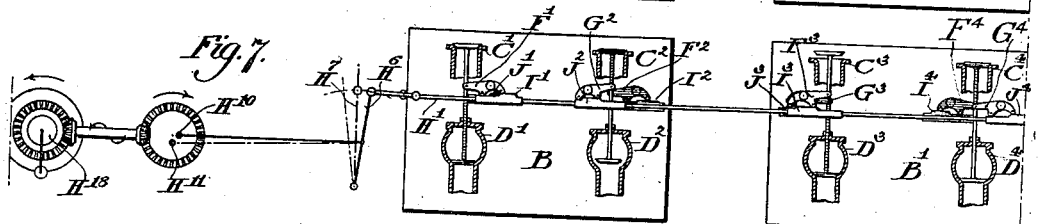
Figure 8:
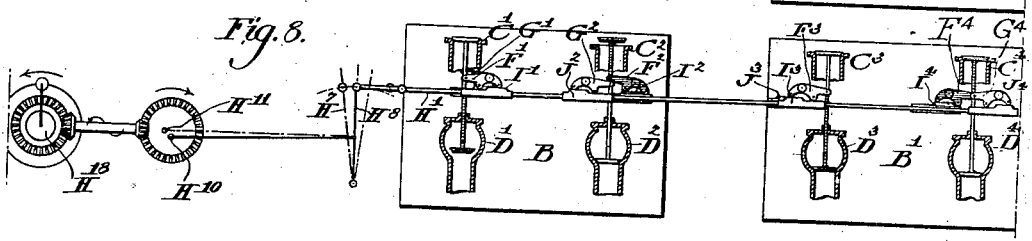

Other features of my invention will be best understood as described in connection with the drawings in which they are illustrated, reference being now had to the drawings in which my invention is illustrated and in which Figure 1, is a side elevation of a two cylinder, four cycle gas engine, provided with my improvements, and shown as coupled to drive a blowing engine. Fig. 2, is a plan view of the engine shown in Fig. 1. Fig. 3, is an enlarged elevation of the cylinder B, and its connected appliances, as shown in Fig. 1. Fig. 4, is a cross-sectional view on the line 4—4, of Fig. 3. Figs. 5, 6, 7, 8, are diagrammatic views illustrating the operation of the actuating cams upon the admission and exhaust valves of the engine. Figs. 9, 10, 11 and 12, are also diagrammatic views illustrating the action of the cams and the consecutive operation of the valves in my engine. Figs. 13, to 16, inclusive, are diagrams indicating the conditions existing in the cylinders of the engine at different times, these views being intended to be considered in connection with diagrams 9, to 12, inclusive, the shading shown in Fig. 13, indicating a new charge being taken into the cylinder end; that shown in Fig. 14, showing the charge being compressed; that shown in Fig. 15, indicating the explosion or combustion of the charge, and that shown in Fig. 16, indicating a charge being exhausted from the cylinder end. Fig. 17, is a diagram intended to be read in connection with Figs. 9 to 12 inclusive. Figs. 18 to 20, indicate permissible modifications of the cam construction.

A, indicates the bed plate of the engine, A', the frame of the blowing engine, $A^2$, the frame of the gas engine, $A^3$, the distance piece situated between the two cylinders of the engine, $A^4$, the crosshead guide at the rear of the rear cylinder.

B, and B', indicate the two gas engine cylinders, $B^2$, standards, arranged one at each end of each cylinder; $B^3$, $B^3$, brackets, arranged alongside of the standards $B^2$.

$B^4$, indicates the piston rod of the engine. C', $C^2$, $C^3$, and $C^4$, are the admission valve casings, placed on the top, and at each end of, the engine cylinders.

D', $D^2$, $D^3$ and $D^4$, are the exhaust valve casings, secured at the sides of the cylinders as shown.

Slide guides E are secured on the brackets $B^3$, and formed, as shown, with two parallel guideways E', and $E^2$.

$E^3$, $E^3$, indicate upwardly extending brackets, secured on the guideways E, and supporting pivot pins indicated at $E^4$. On these pivot pins are secured the two sets of three armed cam actuated levers, those marked F', $F^2$, $F^3$, and $F^4$, being connected to actuate the admission valves, and those marked G', $G^2$, $G^3$ and $G^4$, being connected to actuate the exhaust valves.

H, H, etc., are slides moving in the guideways E′, and E², and formed or connected with two sets of cams, those marked I′, I², I³ and I⁴, being arranged to act on the levers F′, F², etc., and through them to actuate the admission valves, and those marked J′, J², J³ and J⁴, being connected to act upon the levers G′, G², etc., and through them to actuate the exhaust valves.

H′, and H², indicate two lines of parallel reciprocating rods connecting the slides H, in two sets. As shown, these rods are conveniently supplied with adjusting nuts, as indicated at H³; H⁴, see Fig. 3, indicating other adjusting and binding nuts by which the slides can be adjusted on the rods. The two lines of rods are coupled through the connecting rods H⁵, with the two reciprocating levers H⁶, and H⁷, and these in turn are coupled, through the rods H⁸, and H⁹, with the two eccentrics H¹⁰, and H¹¹, which are set at 90° apart on the shaft H¹², which shaft is driven at one half the speed of the main shaft H¹⁸, by the connections illustrated, to wit: The shaft H¹², has secured to it the miter gear H¹³, which is engaged and driven by the miter gear H¹⁴, on the shaft H¹⁵, said shaft being actuated through the miter gears H¹⁶, and H¹⁷, by the shaft H¹⁸.

The construction of the admission valve and valve casing which forms the subject matter of my application, Serial Number 304,627, filed March 7, 1906, is best shown in Fig. 4. The casing K, is formed with an air admission chamber K′, and gas admission chamber K², and has fitted into it the seat portion K³, provided with seats as indicated at K⁴, and K⁵. The portion K, of the casing is situated on a separate portion K⁶, which fits in the admission port of the engine, as shown, and is formed with a valve seat K⁷, at its bottom.

K⁸, indicates the cover of the casing through which extends the sleeved valve stem L, having secured to it the valve portions, one, indicated at L′, adapted to seat itself on the seat K⁵, and the other, indicated at L², being a cylinder valve adapted to close the port, indicated at K⁴. Through the sleeve stem L, extends the valve rod M, supporting at its end, the valve M′, which is adapted to seat itself on the seat K⁷. The stem M, is secured to one end of the lever N, pivoted on one of the standards B², the opposite end of the lever being connected, through the angular heads N′, with one of the valve actuating rods N², which, in turn, is coupled to one of the series of valve actuating levers F′, F², F³, etc. as shown. The angular heads N′, are adapted to enable the rods N², to be coupled by pins H⁷, as indicated in Fig. 4, so as to be actuated either by the inside or outside line of reciprocating cams.

N³, indicates a grooved segment secured on the inner arm of the lever N, as shown in Fig. 4.

O, O, etc., are lever arms coupled to the tops of the sleeve stems L, and pivoted on shafts O′, the squared ends of which move in slots B⁶, of the standards B². The levers O, are connected by links O², with slides O³, moving in the slotted segment N³, and are connected by links O⁴, and lever arms O⁵, with a longitudinally running rod O⁶, supported in the standards B², as shown, and coupled to be actuated by a governor, as indicated at O⁸, in any convenient way.

The exhaust valve casings which form the subject matter of my application Serial Number 304,626, filed March 7, 1906, are made up of portions P, which, as shown in Fig. 4, have circular openings P′, and P², at top and bottom, both larger than the largest diameter of the exhaust valve.

P³, indicates a water cooled cylinder fitting in the opening P′, and P⁴, indicates a water cooled seat portion fitting in the opening P², and extending below the seat in cylindrical form, passing through a stuffing box P⁶, into the exhaust conduit P⁵.

Q, indicates the water cooled exhaust valve having a cylindrical portion Q′, which fits in the cylinder P³, and a valve portion Q², adapted to seat itself on the seat P⁴, as shown. These valves are coupled, through rods R, which preferably extend up through the slide guides E, between the two slides H, H, as shown, and are coupled, through pins R′, extending alternately inward and outward, with the cam actuated levers G′, G², G³, and G⁴.

In Fig. 18, I have indicated a type of oscillating cam I⁵, secured on a pivot E⁵, which can be used in place of the reciprocating cams I′, J′ etc. In Fig. 19, I have indicated at I⁶, a form of angular reciprocating cam, which can be also substituted for the cams I′, J′, etc., such cams being coupled to the rods N, for instance, through the sliding blocks N⁴; E⁶, indicating the slide guides for both the cams I⁶, and blocks N⁴. In Fig. 20, I have indicated another form of reciprocating cam I⁷, to be coupled with the rods N², through a slide N⁵, and spring N⁶, E⁷, indicating the cam slide in this construction.

Referring now to the diagrammatic views. Those shown in Figs. 5 to 8 inclusive are easily followed, the views showing the operations of the cams, cam levers, admission and exhaust valves in connection with the motions of the eccentrics H¹⁰, and H¹¹, the positions being illustrated for each half turn of the main shaft H¹⁸, and through two consecutive revolutions of that shaft. The diagrams, Figs. 9 to 12, inclusive, show, at the left hand side, the condition as to opening and closing of the engine valves, and at the right hand side, the positions of the pistons in the cylinders, and the condition of the gas mixtures in the different ends of the cylinders. These diagrammatic views are to be read in connection with the diagrams 5 to 8; Fig. 9 with Fig. 5; Fig. 10 with Fig. 6; Fig. 11 with Fig. 7, and Fig. 12 with Fig. 8. The diagrams show how the motion of the two eccentrics is distributed to move the valves properly on the four cycle principle. The triangles fully shaded in the series 9, to 12, indicate that those particular valves are wide open; the triangles partly shaded indicate the positions in the motion diagrammatically illustrated, in which the valves in question open, such valves being closed in the diagrammatic illustration. The make up of the diagrammatic Figs. 9 to 12, is based on diagram, Fig. 17, S, indicating the eccentric circle which, it will be remembered, describes one revolution while the main shaft of the engine is describing two revolutions; one quarter of the eccentric circle is therefore described during each stroke of the engine piston and equals the time the valves are to be opened whether they are inlet or outlet valves. The shaded segment represents that part of the stroke of the cam utilized to hold the valve open and may obviously be either at the right or the left of the diagram. Thus, as shown, the quarter revolution from $S'$, to $S^2$, corresponds with the open shaded valve position $T'$, $T^2$, of the segment shown above the eccentric circle and corresponding to the segment shown in diagrams 9 to 12. The distance $T^2$, $T^3$, corresponds to the eccentric movement from $S^2$ to $S^3$, or from $S^4$ to $S'$, and the segment $T^3$, $T^4$, corresponds with the eccentric movements from $S^3$ to $S^4$.

It will readily be seen from the diagrammatic illustrations how the operation of the valves of the tandem cylinders, and the four cycle operation of the engine, is carried into effect by my mechanism. Thus, in the position shown in Figs. 5 and 9, the admission valve $C'$, of cylinder B, is open, all the other valves of that cylinder being closed, and the exhaust valve $D^4$, of cylinder $B'$, is open, all the other valves of that cylinder being closed, consequently we have, as shown at the right of Fig. 9, admission at the left hand end of cylinder B, compression at the right hand end of cylinder B, explosion at the left hand end of $B'$, and exhaust at the right hand end of said cylinder. In diagrams Figs. 6 and 10, all the valves of cylinder B, are closed while in cylinder $B'$, the exhaust valve $D^3$, is open, as is also the admission valve $C^4$, consequently we have admission at the right hand end of cylinder $B'$, exhaust at the left hand end of cylinder $B'$, explosion at the right hand end of cylinder B, and compression at the left hand end of cylinder B. In diagrams Figs. 7 and 11, the exhaust valve $D^2$, of cylinder B, is open and the admission valve $C^3$, of the cylinder $B'$, is opened, all the other valves being closed, consequently we have admission at the left hand end of cylinder $B'$, compression at the right hand end of the same cylinder, explosion at the left hand end of cylinder B, and exhaust at the right hand end of cylinder B. Again in diagrams 8 and 12, exhaust valve $D'$, and admission valve $C^2$, of cylinder B, are open all the valves of cylinder $B'$, are closed, consequently we have admission at the right hand end of cylinder B, exhaust at the left hand end of cylinder B, explosion at the right hand end of cylinder $B'$, and compression at the left hand end of $B'$, the four cycle action being thus provided for.

The general action of the eccentrics and connected devices in opening and closing the valves will be clearly understood from what has been already explained.

It will be observed that in the engine disclosed each of the four cylinder ends forms a working chamber having an inlet and an exhaust valve and that the rods $H^1$ and $H^2$ with the slides H form two valve actuating devices which move to and fro synchronously but ninety degrees out of phase with each other and with a frequency of to and fro movement or reciprocation, one-half that of the engine pistons.

Having now described my invention, what I claim as new and desire to secure by Letters Patent is,

1. In a gas engine, a cylinder having admission and exhaust valve casings, said casings being situated some above and some at one side of the cylinder, the combination with valves working in said casings and all having upwardly extending actuating rods, and valve actuating mechanism situated adjacent the portion of the cylinder between the valve casings at the top of the cylinder and those at the side of the cylinder, said mechanism acting on the valves through their upwardly extending rods.

2. In a gas engine, a cylinder having admission and exhaust valve casings, said casings being situated some at the top and some at one side of the cylinder, in combination with vertically movable valves, working in said casings, having valve rods extending upwardly therefrom, and valve actuating mechanism situated at the side of the cylinder between the valve casings at the top of the cylinder and those at the side of the cylinder, said mechanism acting on the valves through these upwardly extending rods.

3. In a four-cycle gas engine having a plurality of cylinder ends, in which explosions occur at different times and having synchronously reciprocating pistons, an inlet valve and an exhaust valve for each cylinder end, two sets of valve actuating devices, means for moving said devices to and fro in synchronism, but ninety degrees out of phase with each other, and with a frequency one-half that of the pistons, and connections whereby each device actuates the admission valves of one or more cylinder ends and the exhaust valves of one or more cylinder ends, and the inlet valve of each cylinder end is actuated by one device and the exhaust valve of the same cylinder end is actuated by the other device.

4. In a gas engine having two cylinders of the four cycle type, the combination with the admission and exhaust valves thereof, of two sets of cams, two eccentrics, set at ninety degrees apart and rotating at one half the speed of the main engine shaft, connected to actuate said sets of cams, means operatively connecting the admission valves of each cylinder alternately with cams of the different sets, and means connecting the exhaust valves of each cylinder also with cams of the different sets, and so that the admission and exhaust valves at each end of a cylinder are actuated by cams of different sets.

5. In a gas engine having admission and exhaust valve casings situated some above and some at one side of the cylinder or cylinders, and valves working in said casings, having upwardly extending actuating rods, the combination therewith, of two sets of reciprocating cams, each set being independently actuated by a constantly moving part of the engine, and means operatively connecting the admission valve rods of each cylinder alternately with cams of the separate sets, and the exhaust valve rods, also alternately, with cams of the different sets, the admission and exhaust valve at each end of a cylinder being actuated by cams of the different sets.

6. In a gas engine having admission and exhaust valve casings situated some above and some at one side of the cylinder or cylinders, and valves working in said casings having upwardly extending actuating rods, the combination therewith of two sets of reciprocating cams, two eccentrics, set at a right angle to each other and rotating at one half the speed of the main shaft of the engine, connected to actuate said sets of cams, and means operatively connecting the admission valve rods of each cylinder alternately with cams of the separate sets and the exhaust valve rods, also alternately, with cams of the different sets, the admission and exhaust valve at each end of a cylinder being actuated by cams of the different sets.

7. In a gas engine, the combination with the cylinder or cylinders and the admission and exhaust valves thereof, of two sets of reciprocating slides, moving in straight lines and set parallel to each other, means for actuating said sets of slides in relation to each other as described, cams for each admission and exhaust valve, supported on and moving with the slides, and means operatively connecting the valves and cams in such order that the admission and exhaust valves of each end of a cylinder are actuated by cams of different sets, and that the valves of the same kind at opposite ends of the cylinders are also actuated by cams of the different sets.

8. In a gas engine having admission and exhaust valve casings situated some above and some at one side of the cylinder or cylinders and valves working in said casings having upwardly extending actuating rods, the combination therewith, of slide guides set at the sides of the cylinders, two sets of reciprocating slides actuated by constantly moving parts of the engine, cams for each admission and exhaust valve, moving with said slides, and means operatively connecting the admission and exhaust valves alternately with cams of the different sets.

9. In a gas engine having admission valves set in the tops of its cylinders and exhaust valves set at the sides thereof, the combination therewith, of two sets of reciprocating cams supported on the cylinders between the admission and exhaust valves and actuated by constantly moving parts of the engine as described, mechanism, including walking beam levers N, N, &c., connecting the admission valves alternately to cams of the different sets, upwardly extending valve rods connected to the exhaust valves, and means connecting said valve rods alternately to cams of the different sets.

10. In a gas engine having admission valves set in the tops of its cylinders and exhaust valves set at the sides thereof, the combination therewith, of two sets of reciprocating cams supported on the cylinders immediately above the exhaust valves and actuated as described, mechanism, including walking beam levers N, N, &c., connecting the admission valves alternately to cams of the different sets, upright valve rods extending from the exhaust valves between the two sets of cams, and means operatively connecting said rods alternately with cams of the different sets.

11. In a four-cycle gas engine having two double-acting cylinders arranged in tandem with synchronously reciprocating pistons and with an admission and exhaust valve at each end of each cylinder, the combination of two straight line reciprocating valve actuating devices, means for reciprocating said devices in synchronism, but ninety degrees out of phase with each other and with a frequency one-half that of the pistons, and connections whereby each of said devices actuates the admission valves in two cylinder ends and the exhaust valves in the other cylinder ends, and the inlet valve at one cylinder end is actuated by one of said devices and the exhaust valve at the same cylinder end is actuated by the other of said devices.

GUSTAV B. PETSCHE.

Witnesses:
ARNOLD KATZ,
D. STEWART.